United States Patent [19]

Inage et al.

[11] Patent Number: 5,350,900
[45] Date of Patent: Sep. 27, 1994

[54] TEMPERATURE CONTROL HAVING IMPROVED RELIABILITY AS A RESULT OF HAVING PLURALITY OF CONTROL MEANS AND DISABLING MEANS

[75] Inventors: Osamu Inage, Yokohama; Kazuyuki Shimada, Choufu, both of Japan

[73] Assignee: Ricoh Company, Ltd., Tokyo, Japan

[21] Appl. No.: 914,774

[22] Filed: Jul. 15, 1992

[30] Foreign Application Priority Data

Jul. 25, 1991 [JP] Japan .................... 3-186402

[51] Int. Cl.$^5$ .............................. H05B 1/02
[52] U.S. Cl. ............................ 219/508; 219/481; 219/497; 219/501; 219/505; 307/117
[58] Field of Search ............ 219/508, 509, 494, 497, 219/216, 442, 481, 501, 505; 307/117, 119

[56] References Cited

U.S. PATENT DOCUMENTS

| | | | |
|---|---|---|---|
| 4,278,872 | 7/1981 | Koether et al. | 219/494 |
| 4,320,285 | 3/1982 | Koether | 219/497 |
| 4,556,779 | 12/1985 | Hashimoto et al. | 219/216 |
| 4,586,149 | 4/1986 | Stillman et al. | 364/557 |
| 4,782,215 | 11/1988 | Kadwell et al. | 219/494 |
| 4,812,625 | 3/1989 | Ceste, Sr. | 219/442 |
| 4,908,498 | 3/1990 | Kivela | 219/494 |
| 4,994,852 | 2/1991 | Matsuuchi et al. | 219/216 |
| 5,023,631 | 6/1991 | Negishi et al. | 346/154 |

FOREIGN PATENT DOCUMENTS

| | | |
|---|---|---|
| 0370520 | 5/1990 | European Pat. Off. . |
| 2635019 | 2/1977 | Fed. Rep. of Germany . |
| 3802728 | 8/1988 | Fed. Rep. of Germany . |
| 3915024 | 11/1989 | Fed. Rep. of Germany . |
| 56-11152 | 3/1981 | Japan . |
| 57-171366 | 10/1982 | Japan . |
| 58-55504 | 12/1983 | Japan . |
| 60-176076 | 9/1985 | Japan . |
| 0624715 | 1/1987 | Japan . |
| 63-88570 | 4/1988 | Japan . |
| 1260477 | 10/1989 | Japan . |
| 1556766 | 10/1976 | United Kingdom . |
| 2201635 | 9/1988 | United Kingdom . |

OTHER PUBLICATIONS

Ser. No. 07/763,930 filed on Sep. 23, 1991.

*Primary Examiner*—Mark H. Paschall
*Attorney, Agent, or Firm*—Cooper & Dunham

[57] ABSTRACT

A first control device controls a temperature of an object so as to make it near a first predetermined temperature. A second control device stops heating the object if a temperature thereof reaches a second predetermined temperature as a result of a temperature thereof increasing because the first control device is substantially disabled. The second predetermined temperature is higher than the first predetermined temperature.

9 Claims, 11 Drawing Sheets

NORMAL CONTROL (BY 1ST CONTROL MEANS)

FIG. 9

Sch-FAULT-CONDITION CONTROL (BY 2ND CONTROL MEANS)
(Sch IS "L")

FIG. 10

1ST SERIOUS-EMERGENCY SHUT-DOWN PROTECTION
(BY 1ST DISABLE MEANS)

FIG. 11

2ND SERIOUS-EMERGENCY SHUT-DOWN PROTECTION
(BY 2ND DISABLE MEANS)

TEMPERATURE CONTROL HAVING IMPROVED RELIABILITY AS A RESULT OF HAVING PLURALITY OF CONTROL MEANS AND DISABLING MEANS

BACKGROUND OF THE INVENTION

The present invention relates to a temperature control, it particularly relates to temperature control for fixing a picture on paper, to which the picture is to be transferred ( this is referred to as "transferee paper" hereinafter ), in a picture reproducing process. This picture reproducing process may be particularly used in a picture reproduction forming apparatus employing an electrophotographic method, for example, an optical printer such as a laser printer, a duplicator, or a facsimile machine.

Generally speaking, in a picture reproducing apparatus of an electrophotographic method, for example, a laser printer, a picture fixing unit is used. The picture fixing unit is used for fixing a picture on a transferee paper, which picture has been transferred from a surface of a photosensitive belt member by means of toner. A heat roller is used in the picture fixing unit for heating and pressing a made-from-toner-picture on transferee paper so as to fix a picture on the transferee paper.

In the picture fixing unit, the heat roller is heated by means of an internal-heater. A picture-fixing-temperature-controlling apparatus ( it is referred by "PFTC apparatus" hereinafter ) is used in the picture fixing unit for controlling a surface temperature of the heat roller at a predetermined temperature. The PFTC apparatus interrupts electric power supply to the heater by means of a thermostat or a temperature-controlled fuse ( referred by "TC fuse" hereinafter ) if the heat roller is heated excessively.

However, generally speaking, a thermostat and a TC fuse do not have a temperature-response-property such as to prevent the following phenomenon. The phenomenon is that a part of the picture fixing unit may be melted by heat, or smoke may be emitted from a part of the picture fixing unit by heat even if a thermostat or a TC fuse interrupts electric power supply to the heater. The phenomenon may take place because the thermostat or the TC fuse would not interrupt before the corresponding part of the picture fixing unit may be heated excessively.

SUMMARY OF THE INVENTION

The present invention is made for preventing the above mentioned phenomenon. Thus, a first object the present invention is to provide a temperature control having a high reliability to prevent excess heating of an object, for example the above mentioned heat roller of the picture reproducing apparatus.

To achieve the first object of the present invention, a temperature control according to the present invention comprises:
  first control means for controlling a temperature of an object so as to make it be a first predetermined temperature; and
  second control means for controlling a temperature of the object resulting in decreasing temperature if a temperature of the object increases to a second predetermined temperature because the control by the first control means is not possible, the second predetermined temperature being higher than the first predetermined temperature.

The temperature of the object is decreased by the second control means even if the control of the first control means is not possible. Thus excess heating of the object can be prevented in spite of the impossibility of normal control by the first control means.

A second object of the present invention is to provide a temperature control wherein a chance of recovery of the control of the first control means is created after an impossibility of recovery occurs.

To achieve the second object of the present invention, a temperature control according to the present invention wherein:
  the above mentioned second control means controls a temperature of the object so as to make it be the second predetermined temperature if a temperature of the subject reaches the second predetermined temperature as a result of a temperature increase because the control by the first control means is not possible; and
  further comprises first disabling means for disabling the first and second control means substantially so as to stop heating the object after a predetermined period has elapsed for a condition where a temperature of the object is kept in a temperature range from a third predetermined temperature to a fourth predetermined temperature, the third predetermined temperature being higher than the first predetermined temperature and lower than the second predetermined temperature, the fourth predetermined temperature being higher than the second predetermined temperature.

Thus, the second control means and first disabling means create the chance of recovery of normal control by means of the first control means so that recovery of the first control means can be performed during the predetermined period. Then after the recovery, normal temperature control by means of the first control means can be performed again.

Unless the recovery can be performed during the predetermined period, the first and second control means are substantially disabled by the first disabling means so as to stop heating in order to prevent trouble in the object. Such trouble may occur as a result of the object being at the second predetermined temperature, which is higher than the first predetermined temperature, that is a temperature of normal temperature control for the object.

The third object of the present invention is to provide a temperature control for preventing an excess heating of the object in spite of substantial disabling of the above mentioned first and second control means and the first disabling means.

To achieve the third object of the present invention, a temperature control according to the present invention further comprises second disabling for disabling the first and second control means substantially so as to stop heating if a temperature of the object reaches the fourth predetermined temperature as a result of increase of a temperature of the object.

The second disabling means stops heating the object if the first and second control means and the first disabling means are substantially disabled. Thus, an excess heating of the object is prevented in spite of this condition.

As a result of the above mentioned composition of the temperature control, the temperature control having a high reliability can be realized.

DESCRIPTION OF THE PREFERRED EMBODIMENT

Firstly, a construction of a laser printer will be described in conjunction with FIG. 1. The laser printer has a function such as controlling of temperature in fixing a picture on transferee paper in a picture reproducing process according to the present invention.

The laser printer housing 1 consists of an upper housing 1a and a lower housing 1b. The upper housing 1a is fixed on the lower housing 1b by means of a shaft 2 so that the upper housing is able to be swing open and closed.

Figure 1:
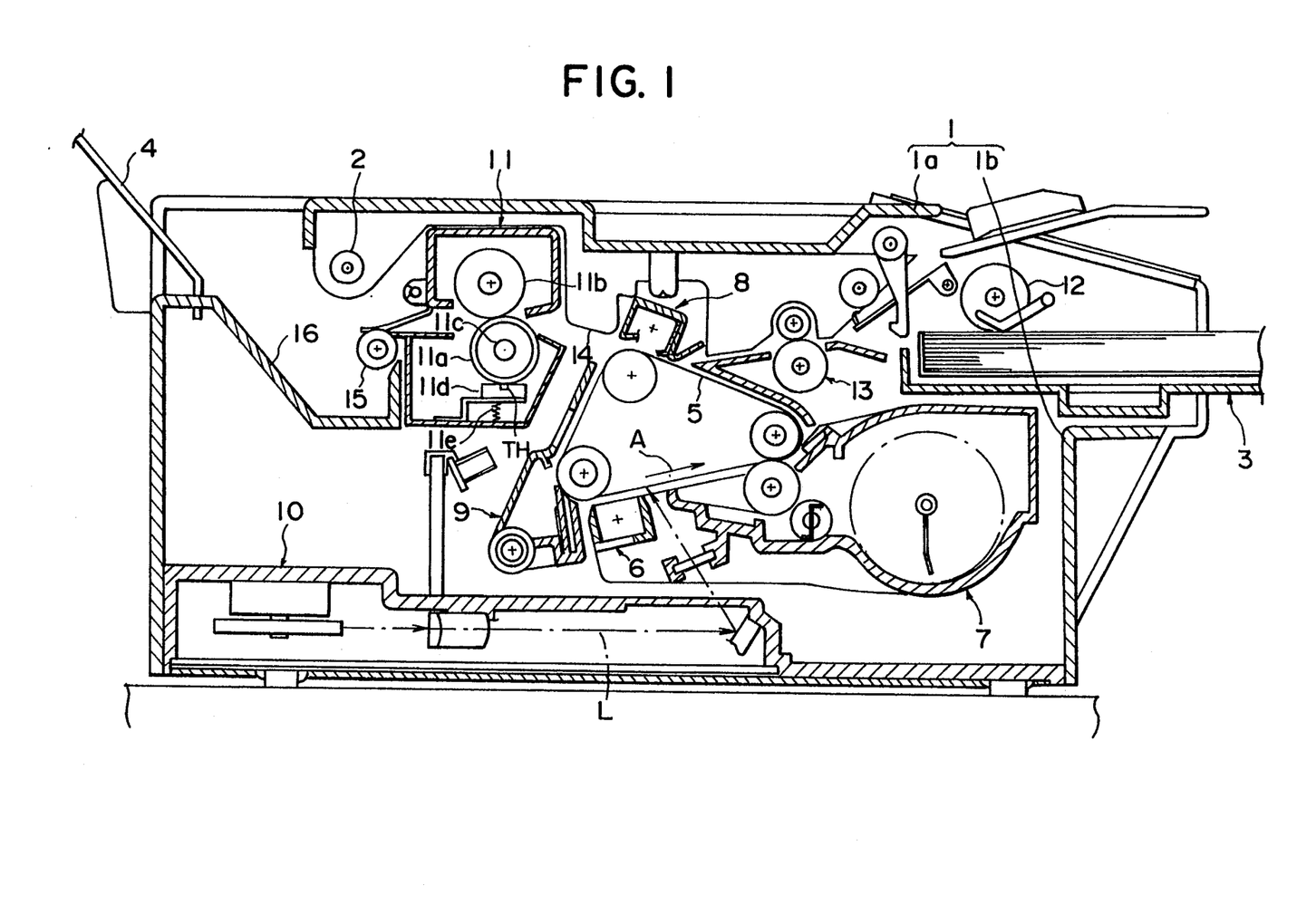
FIG. 1 shows an internal construction of a laser printer having embodiment according to the present invention.

Further, a paper-supply cassette 3 is provided on the right side of the lower housing 1b as in FIG. 1 and a eject-paper-tray 4 is provided on the left side of the lower housing 1b as in FIG. 1. The paper-supply cassette 3 is provided so as to be removable from the lower housing 1b. Also it is possible to use some cassettes as the paper-supply cassette 3 such as to contain papers. The sizes of the paper contained in each cassette is different from the sizes of paper contained in each other cassette.

A belt-like photosensitive belt member 5 is provided approximately in the middle of the printer housing 1. A pre-charger 6, a developing unit 7, a transferring charger 8, and cleaning unit 9 are provided around the photosensitive belt member 5. The equipment 6, 7, 8, and 9 are located so that the above written sequence thereof is according to a direction of an arrow A ( a direction of conveyance of the photosensitive belt member 5 ). An electrophotographic c-process equipment,excepting a laser-writing-unit, consists of the equipments 6 through 9. The laser-writing-unit 10 is provided on an upper side as in FIG. 1 of the electrophotographic-process equipment. And a picture fixing unit 11 is provided a lower side as in FIG. 1 of the electrophotographic-process equipment. The picture fixing unit 11 is equipped with heat roller(a picture fixing roller ) 11a, which heat roller 11a is equipped with a heater 11c therein, a pressing roller 11b, and a thermistor TH, which thermistor TH serves as a temperature-detection element(a temperature sensor).

The thermistor TH, for detecting temperature of a surface temperature of the heat roller 11a (this temperature will be referred by 'Tst'), contacts to a surface of the heat roller 11a gently. The thermistor TH is supported by a supporting member 11d, which is made from a sponge, and the thermistor TH is pushed onto a surface of the heat roller 11a by means of a spring 11e. Thus the thermistor TH contacts to a surface of the heat roller 11a gently as mentioned above.

A paper-supply part, a carrying-paper guide 14, and an eject-paper part are also provided in the printer housing 1. The paper-supply part comprises a paper-supply roller 12, a pair of resist rollers 13 and other members. And the eject-paper part comprises an eject-paper roller 15 and an eject-paper-guide plate 16.

An operation of the laser printer, a construction of which printer is mentioned above, will be described below. Firstly, a starting command is transferred from a host system, such as a word processor, a computer or other systems. Then a printing-operation-sequence is started by the command. In the printing-operation-sequence, paper is transferred from the paper-supply cassette 3 by means of the paper-supply roller 12. Then the paper is carried by the pair of resist rollers 13 so as to be placed on the photosensitive belt member 5 in a proper timing.

Then the photosensitive belt member 5 is conveyed in a direction of the arrow A. A surface of the photosensitive belt member 5 is charged with electricity uniformly by means of the pre-charger 6. A laser beam L, which is modulated by a picture information signal and other signals, is applied to the surface of the photosensitive belt member 5 so as to expose the surface by the laser-writing unit 10. During the exposure, the laser beam L is scanned in a direction of a width of the photosensitive belt member 5 by the unit 10. This scanning operation of the unit 10 is referred to by a term 'main scanning', and the direction of this scanning operation is a direction perpendicular to the plane of FIG. 1. Thus, an electrostatic-latent-image is formed on the surface of the photosensitive belt member 5 by the exposure of the laser beam L.

Toner adheres onto the surface of the photosensitive belt member 5 due to the latent image scanned onto the member 5 while the member 5 passes the developing unit 7. Thus the latent image on the photosensitive belt member 5 is developed by means of the toner. The picture developed by means of toner will be referred to by a term 'a toner picture' hereinafter. The paper is placed on the member 5 by means of the pair of resist rollers 13 as mentioned above. Then the developed toner picture on the member 5 is transferred to a bottom surface of the paper by means of the transfer charger 8. Then the paper, to which the toner picture has been transferred, is conveyed to a position between the heat roller 11a and the pressing roller 11b, being guided by the carrying-guide-plate 14. The rollers 11a and 11b are provided in the picture fixing unit. The toner picture developed on the paper is then fixed on the paper by means of heat produced by the heater 11c while the paper passing the position between the two rollers 11a and 11b. The paper is sandwiched by the rollers 11a and 11b while passing the position.

The paper with fixed picture thereon is then exhausted from the picture fixing unit 11. The paper exhausted from the unit 11 is then carried by the eject roller 15 so as to be transferred to the eject tray 4, being guided by the eject-guide-plate 16. The paper transferred to the eject tray 4 is then stacked on the eject tray 4.

Next, one embodiment of a PFTC apparatus according to the present invention, which PFTC apparatus is a part of the above mentioned laser printer, will described in conjunction with FIG. 2 below.

In the PFTC apparatus, the heater 11c is equipped in the heat roller 11a as mentioned above. Electric power is supplied to the heater 11c from the power source AC through a main switch 21, a fuse 22, a relay 23, and a triac 24. Then the heat roller 11a is heated by means of heat generated by the heater 11c.

The thermistor TH actually contacts a surface of the heat roller 11a as shown in FIG. 1. Thus, a resistance of the thermistor TH varies correspondingly to the surface temperature Tst of the heat roller 11a. That is, the resistance of the thermistor TH will decrease due to increase of the temperature. Then, a magnitude of an electric current I varies due to the variation of the resistance of the thermistor TH. Here, the current I flows from a direct-current power-source of +5 volts to the earth through a resistance R and the thermistor TH.

Figure 2:
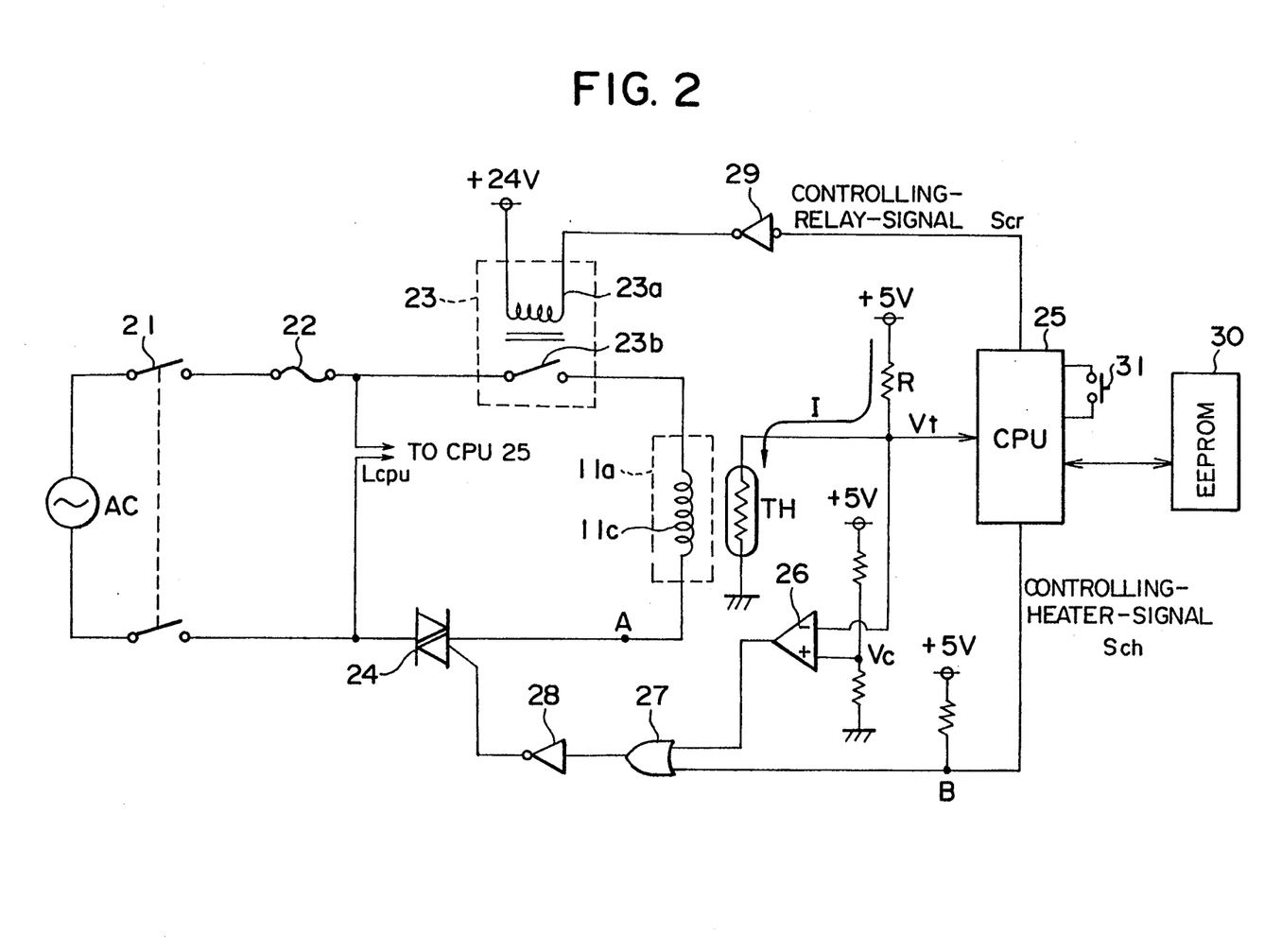
FIG. 2 shows a circuit diagram of the embodiment.

In a serial circuit comprising the resistance R and thermistor TH as shown in FIG. 2, a variation of the electric current I such as mentioned above is converted to a variation of a voltage Vt. Here, the variation of the electric current I is caused by a variation of the temperature Tst as mentioned above. The voltage Vt is then applied to a micro-computer 25. The micro-computer 25 will be referred to by a term 'CPU' hereinafter. The voltage Vt is also applied to an inverting-input-terminal(symbolized by minus symbol "−") of a comparator 26.

An output of the CPU 25 is controlled by the CPU 25 due to the voltage Vt as follows. This controlling of the output of the CPU 25 is performed by means of determination for the temperature Tst. The determination for the temperature Tst in the CPU 25 is performed in the following manner. Firstly, the temperature Tst is converted to the voltage Vt through the electric current I as mentioned above. A manner of the determination is so that the output of the CPU 25 is determined to be a low level "L" if the temperature Tst is lower than a first predetermined temperature T1, while the output is determined to be a high level "H" if the temperature Tst is higher that the temperature T1. The temperature T1 was determined previously as a optimum temperature for fixing a picture on a transferee paper during the above mentioned picture reproducing process. The output of the CPU 25 is used for controlling heater 11c. The output is referred by 'Sch'.

Another manner of the determination for the temperature Tst will be described below. The above mentioned Sch, supplied by the CPU 25, is retained at the above mentioned "L" level constantly in the following two situations, otherwise the Sch is then changed to the above mentioned "H" level. One of the situations is that the temperature Tst is kept in a temperature range between a third predetermined temperature T3 and a fourth predetermined temperature T4 continuously during a predetermined duration Δt.

The third predetermined temperature T3 is higher than the first predetermined temperature T1. The temperature T3 is just too high temperature for fixing a picture in a transferee paper in the picture reproducing process. But this temperature T3 may not cause damage on the transferee paper unless the temperature T3 is kept during more that a predetermined period Δt. The fourth predetermined temperature T4 is higher than the third predetermined temperature T3. The other situation is that the temperature Tst reaches the fourth predetermined temperature T4. The temperature T4 may cause a damage on the transferee paper soon.

The comparator 26 shown in FIG. 2 compares the voltage Vt applied to the inverting-input-terminal with a reference voltage Vc applied to a non-inverting-terminal (symbolized by a plus symbol "+"). The comparator 26 supplies the following output states as a result of the comparison of the Vt with the Vc. One of the output states is "H" which is supplied if Vt≧Vc, while the other is "L" supplied if Vt <Vc. The reference voltage Vc has been determined with respect to the above mentioned temperature Tst, Vt being controlled by the temperature of Tst detected by current flowing through the thermistor TH. The Vc has been determined so that a relationship between Vt and the Vc is that of 'Vt <Vc' if the temperature Tst reaches a second predetermined temperature T2.

The second predetermined temperature T2, being for example, 250° C., is higher than the third predetermined temperature T3 and lower than the fourth predetermined temperature T4. is higher than the above mentioned third predetermined temperature T1. The temperature T2 is just too high temperature for fixing a picture on a transferee paper in the picture reproducing process. But this temperature T2 may not cause damage to the transferee paper unless the temperature T2 is kept for more than a predetermined period Δt.

OR gate 27 supplies an "L" output if "L" inputs are respectively applied to both input terminals of the gate 27. The output of the gate 27 is applied to the triac 24 through an inverter 28. The triac 24 becomes under an "ON" condition if the output of the gate 27 is "L", which is inverted to "H" as a result of passing through the inverter 28. The electric power supplied by the AC source passes through triac 24 the as a result of becoming under the "ON" condition so that the electric power is supplied to the heater 11c. OR gate 27 supplies an "H" output if at least one of input signals respectively applied to both input terminals is "H". The triac 24 thus becomes under an "OFF" condition as a result of being applied an "L" signal from the gate 27 through the inverter 28. The triac thus break the electric power supply from the AC source to the 11c.

The relay 23 is a normally-open-contact-type relay. The relay 23 closes a normally-open-contact 23b so as to pass the electric power if electric current flows in a coil 23a. The electric current generated by a buffer 29 flows in the coil 23a due to a controlling-relay-signal Scr of state "L" input to the buffer 29. The Scr is supplied by the CPU 25. The electric power provided from the AC source is supplied to the heater 11c through the contact 23b. On the other hand, the contact 23b of the relay 23 opened due to the lack of the electric current given to the coil 23a. The lack of the electric current results from the Scr of state "H" given to the buffer 29. The electric power supply to the heater 11c is thus broken.

An advantage of a temperature control using switching means such as the triac 24 and the relay 23, which operate as a result of being controlled by control means such as the CPU 25 comparator 26 in response to a temperature detecting signal given by the thermistor TH, as mentioned above, is described below. Conventional temperature-sensing-interrupting means (referred to by "TSI means" hereinafter) such as the TC fuse as mentioned above have a disadvantage, which is described below. The TSI means interrupts a circuit because of stored heat energy given as a result of absorbing heat from outside. This TSI means has a heat capacity. Thus in a case of sharp increase of the temperature, the temperature may reach a much higher one, for example 400° C., as a result of increase thereof until the TSI can interrupt the circuit because of the heat capacity. On the other hand, the above mentioned temperature control system does not have such a heat capacity. Thus, a switching response to a temperature variation is excellent in this system.

Next, a function of this embodiment, a composition of which is described above, will be described concretely below in conjunction with FIGS. 3 through 5.

Firstly, in the PFTC apparatus shown in FIG. 2, the main switch 21 is closed. Then, the Scr is provided to the buffer 29 from the CPU 25 due to the electric power supply given to the CPU 25 through electric power supply lines Lcpu. Then, the relay 23 is given the electric current from the buffer 29 so that the contact 23b is closed. Then electric power supply to the heater 11c is started, so that the temperature Tst increases as shown in FIG. 3 in time during t1 through t2. Then the temperature Tst reaches the temperature T1 at a time t2. Then the CPU 25 turns the Sch to "H" so as to make the triac 24 turn to "OFF" through the OR gate 27 and the buffer 28 as mentioned above, the electric power supply to the heater 11c being thus broken.

The breaking of electric power supply to the heater 11c results in decrease of the temperature Tst. Thus the temperature Tst decreases so as to reach the temperature T1 in a time t3 as shown in FIG. 3. Then the CPU 25 turns the Sch to "L" so as to make the triac 24 turn to "ON" through the OR gate 27 and the buffer 28 as mentioned above, the electric power supply to the heater 11c being thus re-started.

Figure 3:
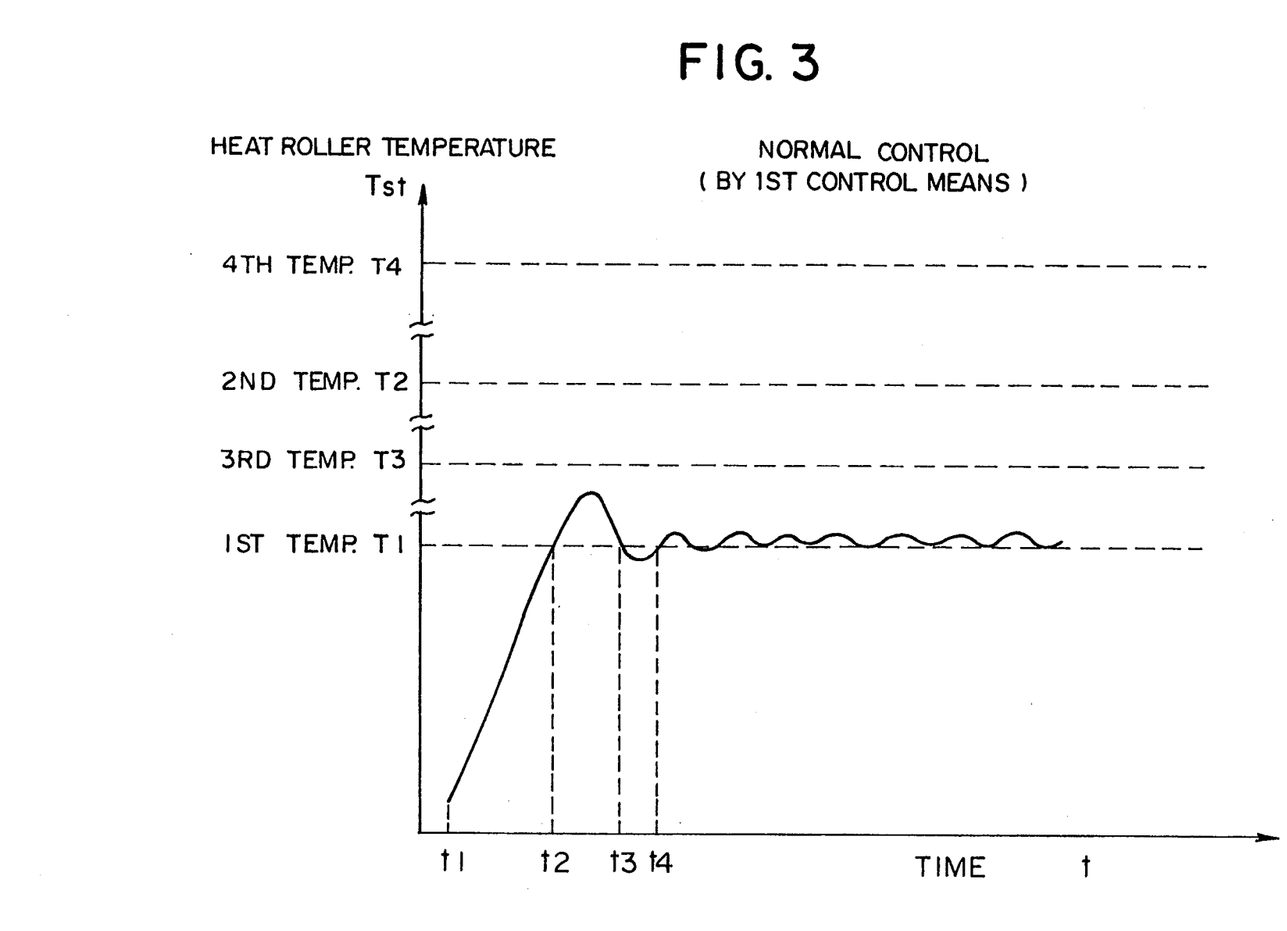
FIG. 3 shows a temperature variation of a heat roller surface of the embodiment in a normal state.

The re-starting of the power supply to the heater 11c results in increase of the temperature Tst so as to make the temperature Tst reach the temperature T1 in a time t4 shown in FIG. 3, the CPU 25 thus turning the Sch to "H" so as to make the electric power supply to the heater 11c broken again.

The above mentioned operation is repeated after the time t4 as shown in FIG. 3, with the restarting and breaking again of the electric power supply to the heater 11c due to increase and decrease of the temperature Tst about the temperature T1. The surface temperature Tst of the heat roller 11a is thus controlled so as to be kept around the temperature T1 after the time t4 as shown in FIG. 3.

Operations of the PFTC apparatus for particularly troublesome cases are described below. A first particularly troublesome case is when a point B of FIG. 2, which is a conductor part between a point pulled up +5 volts and an input terminal of the 0R gate 27, is grounded. This trouble may occur as a result of that a movable part of the laser printer, which applies the PFTC apparatus, located near the point B, may contact with a circuit conductor pattern of a conductor having the point B. This may occur as a result of the movable parts moving because of a certain external force applied. As a result of this, the input terminal of the OR 27 may go to the "L" level.

A second particularly troublesome case is that the above mentioned point B, which is, for example, a part of a circuit conductor pattern of a control circuit board, may be cut off so that the input terminal of the OR 27 may receive neither the Sch from the CPU 25 nor the power source of +5 volts. As a result of this, the input terminal of the OR 27 may go to the "L" level.

A third particularly troublesome case is that an output port of the CPU 25 for supplying the Sch may go to the "L" level because of certain trouble with the CPU 25. As a result of this, the input terminal of the OR 27 may go to the "L" level.

The above mentioned three particularly troublesome cases first through third ones cause the input terminal of the OR 27 to be kept in the "L" level. As a result of this, the triac 24 is not controlled so that the triac 24 does not interrupt the power supply for the heater 11c even if the above mentioned temperature Tst of the heat roller 11a exceeds the first predetermined temperature T1.

A fourth particularly troublesome case is described below. If the heater 11c is heated when an external temperature is low, the temperature Tst of the heat roller 11a may over shoot the first predetermined temperature T1 even if the power supply for the heater 11c is interrupted by the triac 24 as a result of the Sch from the CPU 25. This over shooting may occur for a moment because of a thermal inertia.

Figure 4:
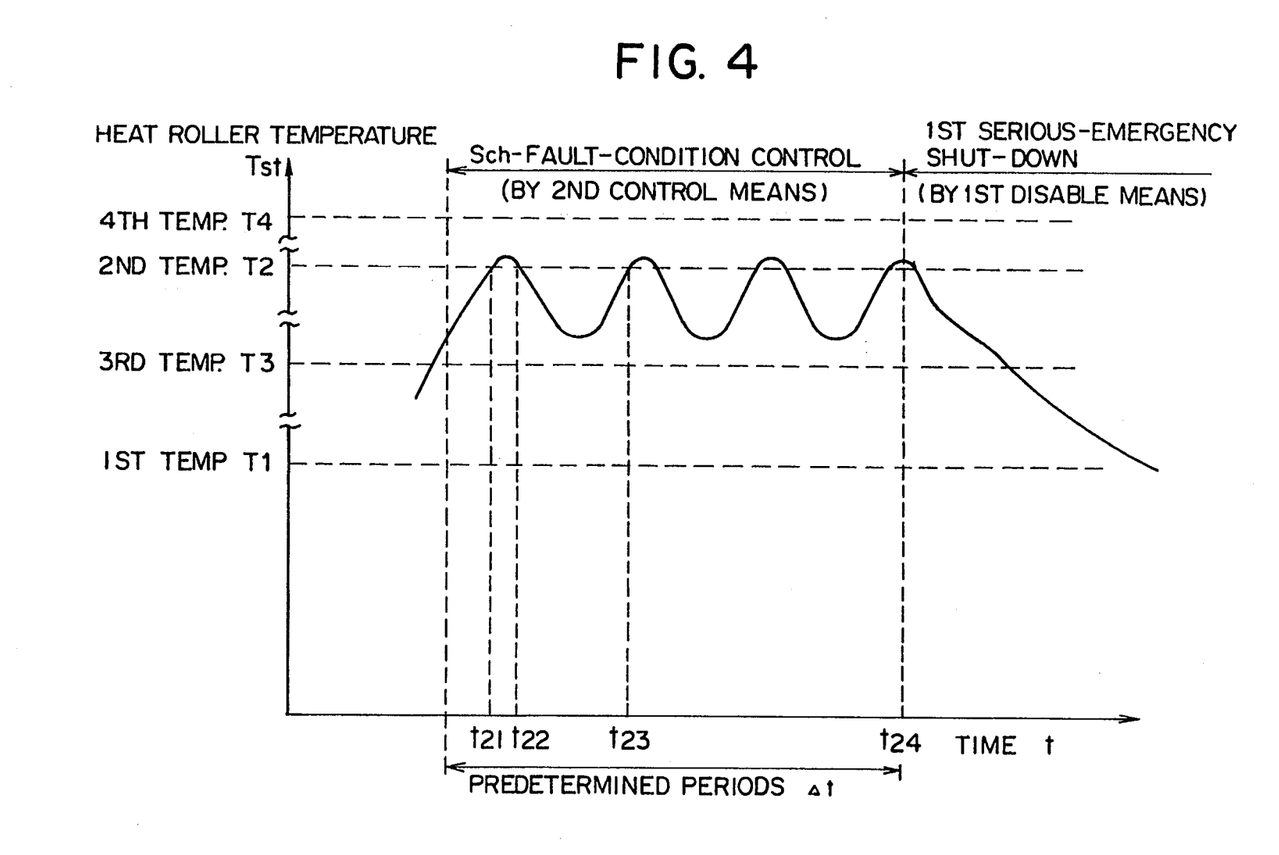
FIG. 4 shows a temperature variation of a heat roller surface of the embodiment in a condition where the temperature reaches a second predetermined temperature, the temperature is then kept in a range between a third predetermined temperature and fourth predetermined temperature during a predetermined period, and the temperature is then decreased.

The above mentioned four particularly troublesome case first through fourth ones result in the temperature Tst exceeding the second predetermined temperature T2 as shown at a time t21 in FIG. 4.

As a result of this, the above mentioned temperature detecting voltage Vt becomes lower than the above mentioned reference voltage Vc. This results in the event that the output of the comparator 26 becomes the "H" level so that the other input of the OR 27 becomes the "H" level. This results in the event that the output of the OR 27 becomes the "H" level, thus the triac 24 interrupts the power supply for the heater 11c.

Then the temperature Tst decreases into the second predetermined temperature T2 as shown at a time t22 in FIG. 4. As a result of this, the voltage Vt becomes equal to or greater than the voltage Vc thus the output of the comparator 26 becomes the "L" level, and this results in the triac 24 going to the "ON" state, then the electric power starts to be supplied to the heater 11c. The comparator 26 actually has a hysteresis property so that the output becomes the "L" level when the temperature Tst decreases into a temperature more or less lower than the second predetermined temperature T2.

Then after the electric power is supplied to the heater 11c, the temperature Tst increases, then it exceeds the T2 again at a time t23 in FIG. 4. The above mentioned operation of the PFTC apparatus, which results in a phenomena as shown between the time t21 and the time t23 of FIG. 4, repeats again and again after the time t23.

If the temperature Tst remains in a temperature range between the third predetermined temperature T3 and the fourth predetermined temperature T4 during the predetermined period Δt as shown at t24 in FIG. 4, the output Scr of the CPU 25, which detects it through the voltage Vt, goes to the "H" level.

This results in that no electric current flows in the coil 23a of the relay 23. As a result of this, the contact 23b is opened, then the power supply for the heater 11c is interrupted.

Then, after this one interruption, the output Scr of the CPU 25 does not return to the "L" level even if the temperature Tst decreases into the third predetermined temperature T3. This condition will be referred to by "the locked condition" hereinafter. It is necessary to operate a dip switch 31 provided in a printed circuit board, which is included in the CPU 25, for removing this locked condition (this will be referred to by "resetting").

The reason why this locked condition is provided in the operation program, which is executed by the CPU 25, is described below. It is considered that some trouble may have occurred in the PFTC apparatus if this locked condition occurs, which trouble may be one of the above mentioned first through third trouble cases. If re-closing of the relay contact 23b is performed unless the cause of the temperature Tst remaining in the range between the temperatures T4 and T3 has not been clarified, other unexpected trouble may occur as a result of this reclosing operation. Thus, the resetting should not be easily performed by a user of, for example, a laser printer which employs the PFTC apparatus.

A method of operation of the PFTC apparatus for provision of this locked condition is described below. Contents indicating that "this interruption by means of the relay 23 is as a result of an abnormally high temperature of the heat roller 11a" are written in a non-volatile storage. Then, after these contents have been written in the non-volatile storage, it is impossible to make the output Scr of the CPU 25 turn to "L" regardless of the temperature detecting signal given, until the contents are erased. Otherwise, the resetting is performed only when a main switch of, for example, a laser printer employing the PFTC apparatus is turned "ON". The non-volatile storage, in this embodiment, comprises an electric erasable programmable read only memory (this will be referred to by "EEPROM") 30.

The CPU 25 supervises a state of the above mentioned dip switch 31 when the above mentioned main switch of the laser printer is turned "ON". If the state of the dip switch 31 is "ON", the resetting is performed so as to erase the above mentioned contents in the EEPROM 30. Then, after the erasing is performed, the output Scr can be turned into the "L" state as a result of the temperature detecting signal being given. Then, after the resetting is performed, the dip switch is automatically turned to the "OFF" state.

On the other hand, if a cause of whichever trouble case of the first through the fourth ones mentioned above is removed within the predetermined period Δt, the PFTC apparatus performs the operation, which results in the phenomena as shown in FIG. 3.

A fifth particularly troublesome case is a trouble with the triac 24. The triac 24 comprises semiconductor circuits, thus a part may become a short circuit. This results in effects like the "ON" state regardless of the control signal given.

A sixth particularly troublesome case is that a point A of the circuit shown in FIG. 2, which is a part of a conductor connecting between the triac 24 and one of the power supply terminals of the heater 11c, is grounded. A cause of this is described below. A harness, for example, is provided in the heater 11c for connecting power supply wires. This harness is normally covered with insulating tubes. However, if the harness is located in a small space for a purpose of minimizing of the outer dimensions of, for example, a laser printer employs the PFTC apparatus, grounding of the harness may occur as a result of a vibration of the laser printer. This is because the insulating tube can be broken by the vibration.

The above mentioned fifth and sixth particularly troublesome cases disable the triac 24 from supplying electrical power into the heater or interrupting it in response to the temperature Tst.

Figure 5:
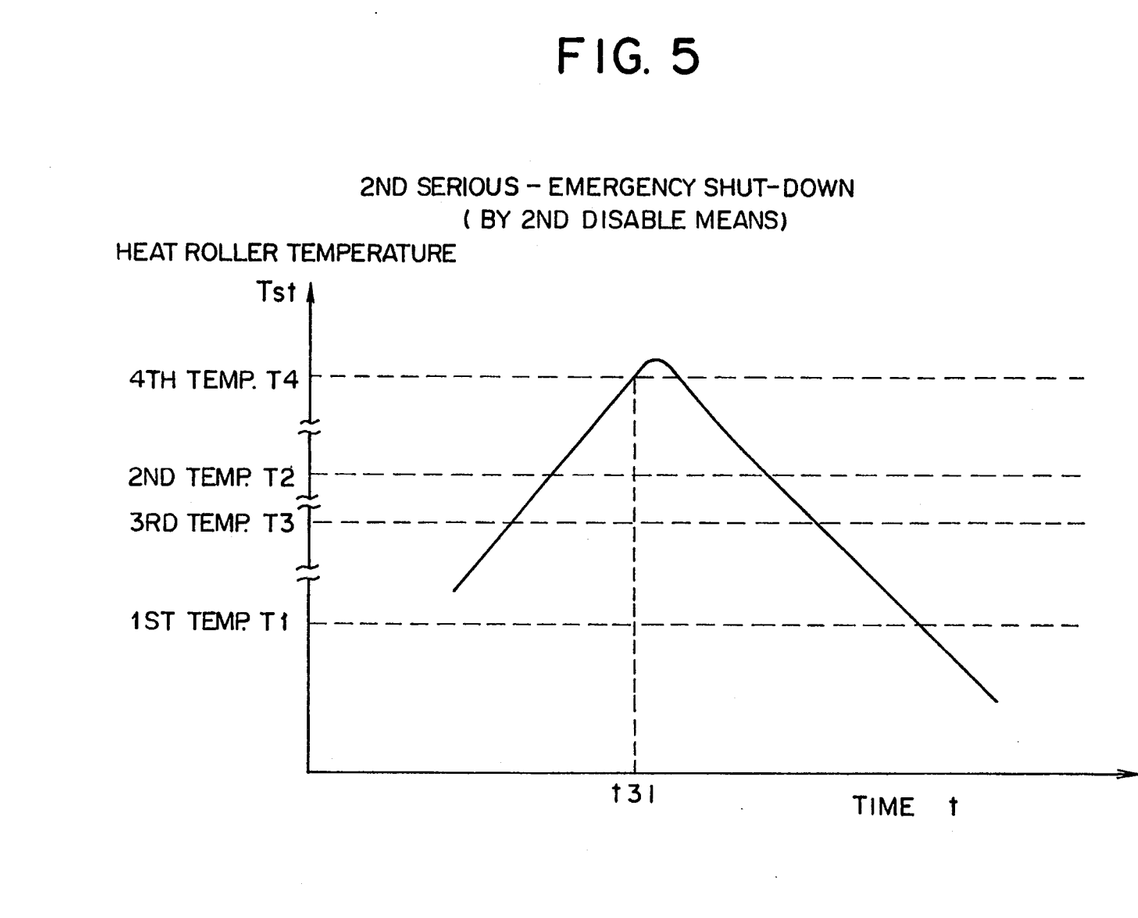
FIG. 5 shows a temperature variation of a heat roller of the embodiment in a condition where the temperature reaches the fourth predetermined temperature, the temperature being then decreased.

In this case, the temperature Tst exceeds the second predetermined temperature T2 as shown at t31 of FIG. 5. Then, after the exceeding of the T2, it reaches the fourth predetermined temperature T4. This results in the CPU 25 making the output Scr go to the "H" state. Thus, the contact 23b of the relay 23 is opened, thus the power supply into the heater 11c is interrupted. Then, after the interruption, the CPU 25 goes into the above mentioned locked condition, which is removed by the above mentioned resetting.

Figure 6:
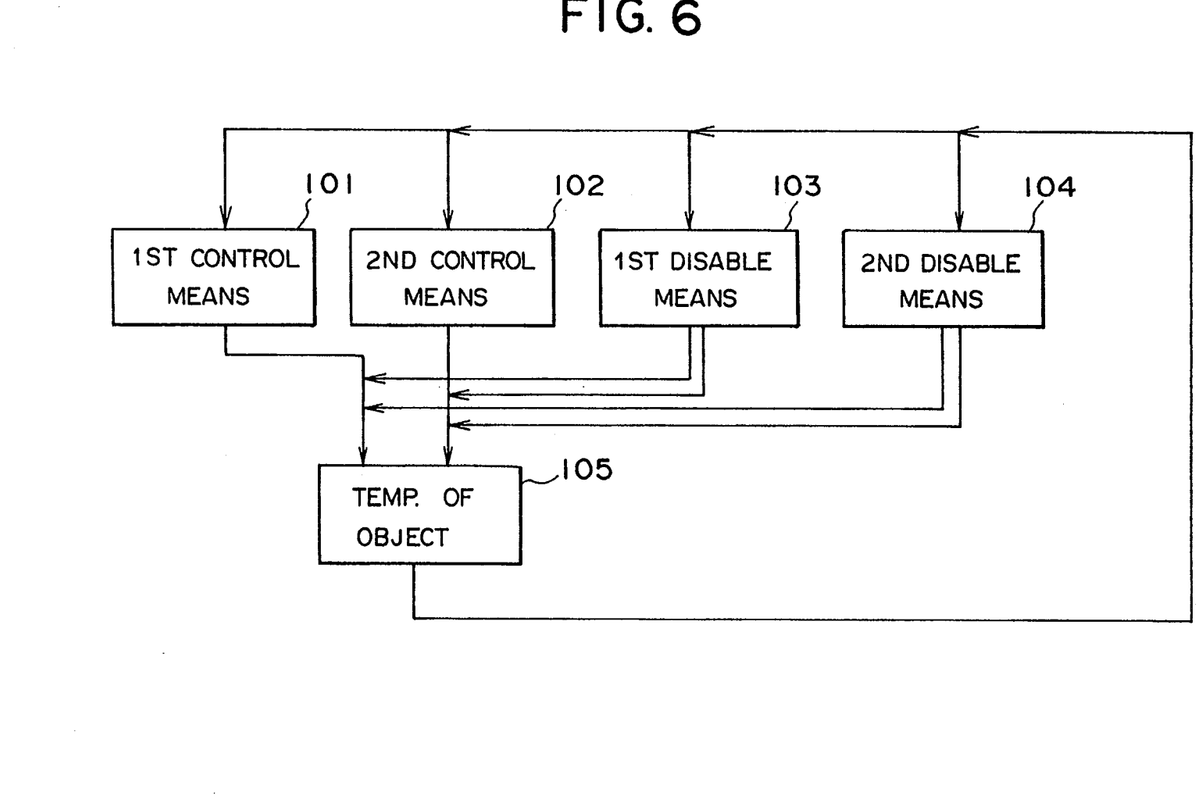
FIG. 6 shows a principle block diagram of a temperature control according to the present invention.
Figure 7:
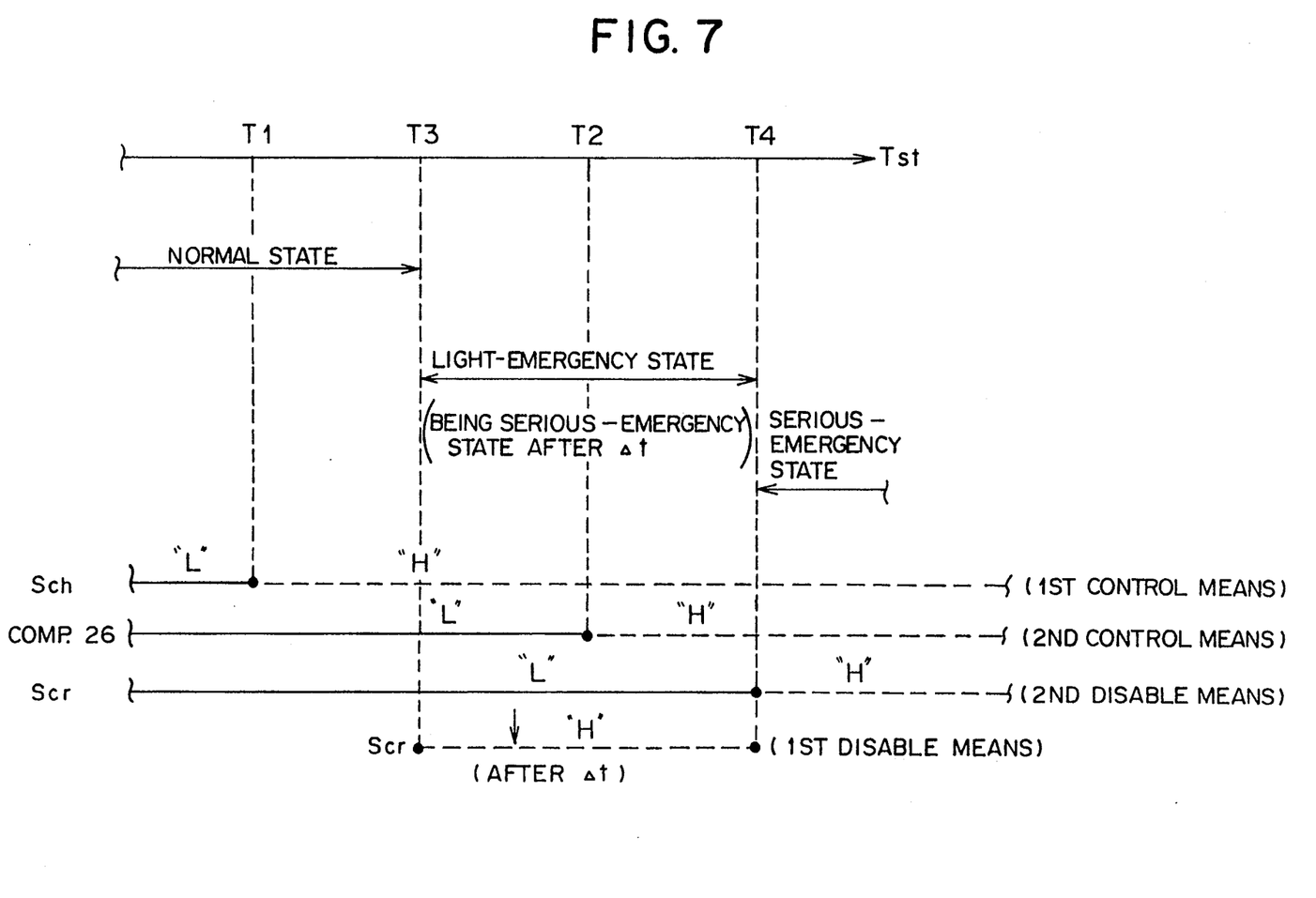
FIG. 7 mows a concept of the embodiment.
Figure 8:
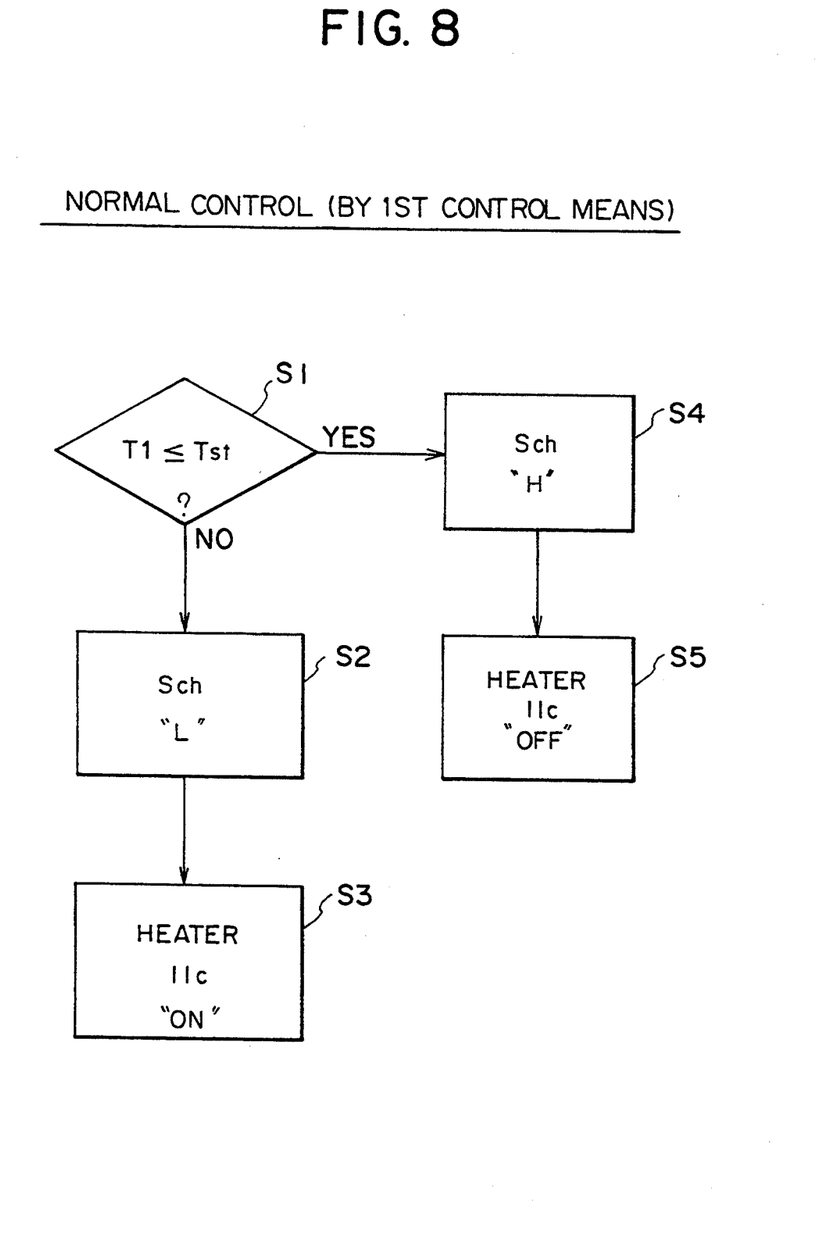
FIGS. 8 through 11 respectively show operation flow charts of the embodiment.

A principle composition of the present invention is described in conjunction with FIG. 6. One of two control means, that is, the first one 101 and the second one 102 in FIG. 6, controls a temperature of an object 105. Otherwise, one of two disabling means, that is, the first one 103, and the second one 104, substantially disable the control means 101 and 102 so as to stop heating. These two control means correspond to the CPU 25, and the comparator 26 respectively, and both disabling means correspond to the CPU 25 in the PFTC apparatus as the embodiment of the present invention as shown in FIG. 2. Further, the object corresponds to the heat roller 11a.

A concept of the PFTC apparatus is described below in conjunction with FIGS. 7 through 11. A temperature range below the T3 is for a normal state. On the other hand, a temperature range between the T3 and the T4 is for a light-emergency state. If this states extends beyond the period Δt then it becomes a serious-emergency state. Further, a temperature above the T4 results in the serious-emergency state.

The Sch supplied from the CPU 25 is in the "L" state as shown in step (a term "step" will be omitted for the sake of simplifying) S2 of FIG. 3 for a condition that the temperature Tst is below the T1 as shown in S1. Thus, the electrical power is supplied to the heater 11c as shown in S3. Otherwise, the Sch is in the "H" state as mentioned above as shown in S4 of FIG. 8. Thus, the power supply to the heater 11c is interrupted as shown in S5.

Figure 9:
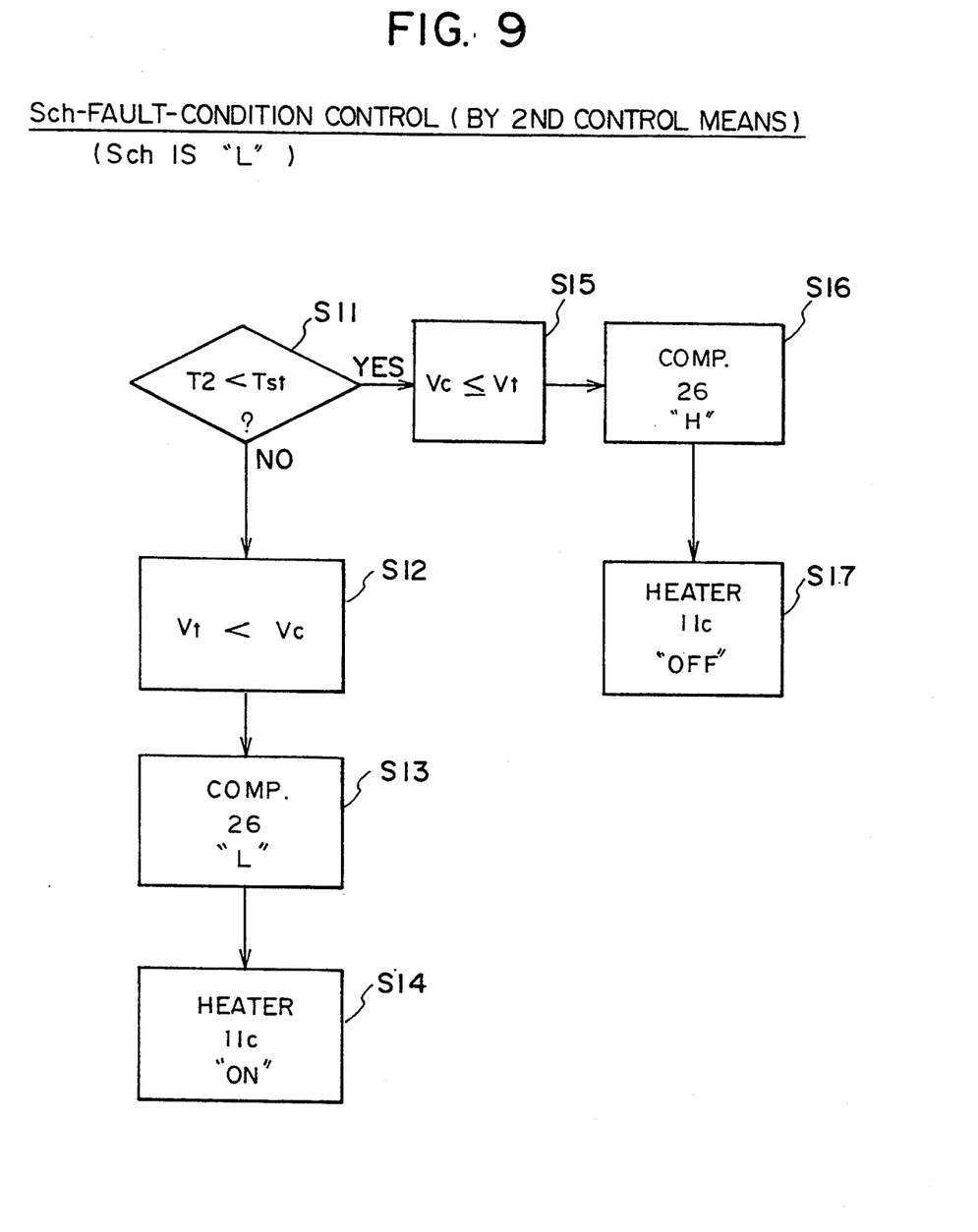

When the CPU 25 has troubles so as to make the Sch be in the "L" state regardless of the temperature Tst, the comparator 26 controls the power supply to the heater 11c as shown in FIG. 9. This is so that if Tst is lower that T2 as shown in S11, Vt becomes lower than the Vc as shown in S12. Thus, the output of the comparator 26 becomes the "L" level as shown in S13, thus the power is supplied to the heater 11c as shown in S14.

Otherwise, Vt becomes equal to or greater than the Vc as shown in S15, and this results in the output of the comparator 26 becoming the "H" state as shown in S16, further this results in the power being supplied to the heater 11c as shown in S17.

Figure 10:
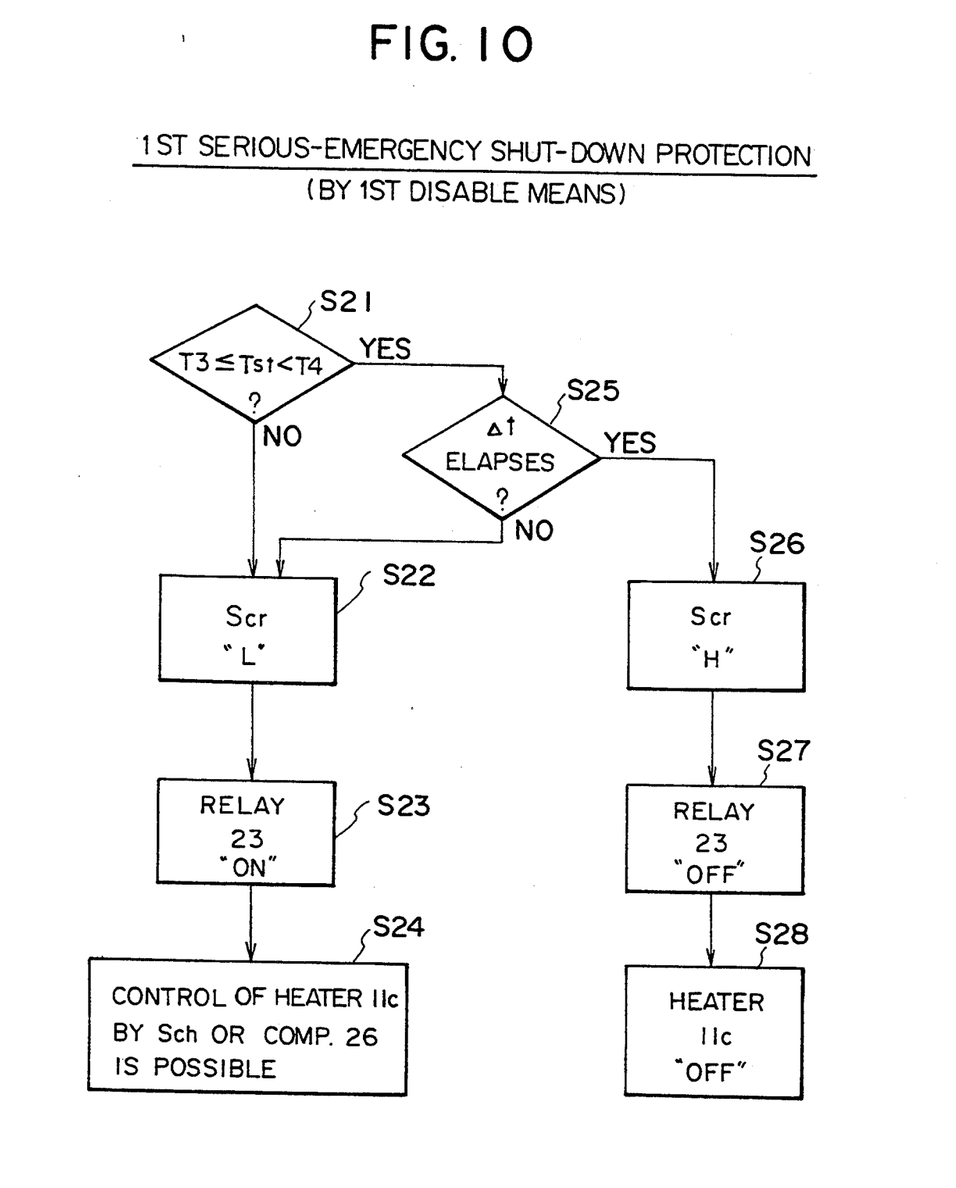

When the Tst remains in a range between the T3 and the T4 during the period Δt, a first serious-emergency shut-down protection is performed as shown in S21 and S25 of FIG. 10. Then, after Tst remains in a range between the T3 and the T4 during the period Δt, the Scr supplied from the CPU 25 becomes the "H" state as shown in S26. This results in the relay 23 turning to the "OFF" state as mentioned in S27, and this results in the power supply to the heater 11c being interrupted as shown in S28.

Otherwise, the Scr becomes the "L" state as shown in S22. This results in the relay 23 turning into the "ON" state as mentioned in S23, and this results in the controlling of the heater 11c by means of the Sch or the output of the comparator as mentioned above becoming possible as shown in S24.

Figure 11:
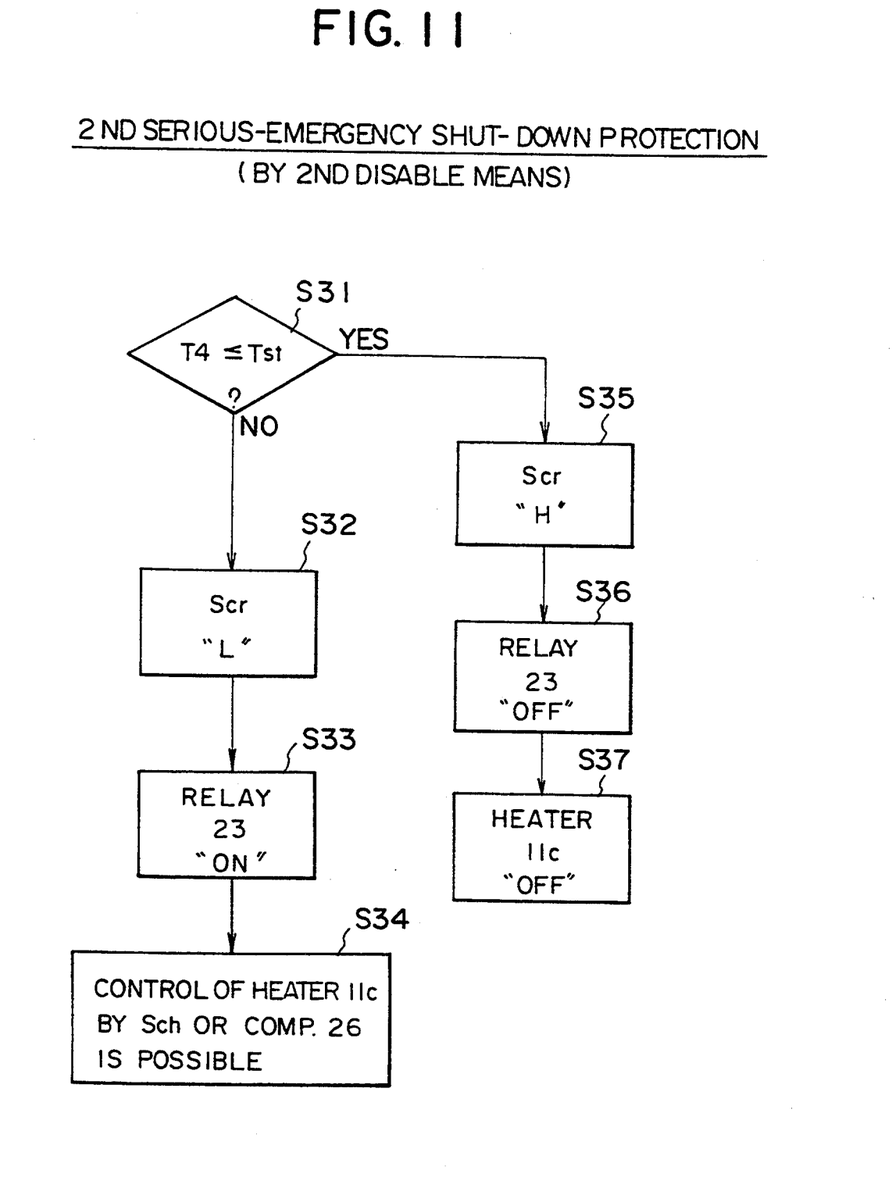

Further, when Tst reaches the T4, a second serious-emergency shut-down protection is performed as shown in S31 of FIG. 11. Then, after Tst reaches the T4, the Scr supplied from the CPU 25 becomes the "H" state as shown in S35. This results in the relay 23 turning to the "OFF" state as mentioned in S36, and this results in the power supply to the heater 11c being interrupted as shown in S37.

Otherwise, the Scr becomes the "L" state as shown in S32. This results in the relay 23 turning to the "ON" state as mentioned in S33, and this results in the controlling of the heater 11c by means of the Sch or the output of the comparator as mentioned above becoming possible as shown in S34.

A first function of the above mentioned function of the PFTC apparatus as the embodiment of the present invention is described below. The electric power supply to the heater 11c is interrupted when the temperature Tst of the heat roller 11a is increased to the second predetermined temperature T2 (this should be not more than 250 degrees centigrade) which is higher that the first predetermined temperature T1. Furthermore, the power supply to the heater 11c is interrupted when the Tst remains in the range between the T3 (this is lower than the T2 and higher than T1) and the T4 (this is higher than T2) during the predetermined period Δt.

An advantage resulting from the first function is that damage, for example, melting because of heat of the fixing unit 11 as shown in FIG. 1 of the laser printer can be prevented. A further advantage is that damage, for example, generation of smoke because of heat from a transferee paper, if it is located in the picture fixing unit 11, can be also prevented. This generation of smoke from the transferee paper may occur in the conventional apparatus if ventilation of an apparatus is not sufficient.

A second function of the PFTC apparatus is to interrupt the electric power supply to the heater 11c if Tst of the heat roller 11a increases to the fourth predetermined temperature T4. An advantage of the second function is that safety properties can be higher than an apparatus having only the above mentioned first function.

A third function is that neither a thermostat nor a TC fuse is used for interrupting the electrical power supply to the heater 11c, but the thermistor TH, the triac 24, and relay 23 are used. An advantage resulting from the third function is that it is possible to reduce cost for the PFTC apparatus.

Further, the present invention can be applied not only to the laser printer as the above mentioned embodiment, but it is possible to apply the present invention to a PFTC apparatus included in the other optical printer, for example, a light emitting diode printer. The present invention can be also applicable to a PFTC apparatus included in each kind of picture reproducing apparatus of an electrophotographic method, for example, a duplicator, a facsimile.

Further, the present invention is not limited to these preferred embodiments, and various variations and modifications may be made without departing from the scope of the present invention.

What is claimed is:

1. A temperature control system comprising:
    a central processing unit processing information concerning a detection signal obtained from a temperature detection element and related to the temperature of an object so as to produce a heater control signal for controlling operation of a heater used for heating said object and the temperature of said object so as to make the temperature of said object substantially equal to a first predetermined temperature; and
    a control unit, which compares a detection voltage based on said detection signal with a predetermined reference voltage so as to produce a heating control signal for controlling operation of said heater independently of said central processing unit, for stopping heating of said object if the temperature of said object increases to a second predetermined temperature because said central processing unit is substantially disabled, said second predetermined temperature being higher than said first predetermined temperature.

2. A temperature control system comprising:
    a central processing unit processing information concerning a detection signal obtained from a temperature detection element and related to the temperature of an object so as to produce a heater control signal for controlling operation of a heater used for heating said object and the temperature of said object so as to make the temperature of said object substantially equal to a first predetermined temperature;
    a control unit, which compares a detection voltage based on said detection signal with a predetermined reference voltage so as to produce a heating control signal for controlling operation of said heater independently of said central processing unit, for controlling the temperature of said object so as to be substantially equal to a second predetermined temperature if the temperature of said object increases to said second predetermined temperature because said central processing unit is substantially disabled, said second predetermined temperature being higher than said first predetermined temperature; and
    a first disabling circuit for substantially disabling said central processing unit and control unit simultaneously so as to stop heating of said object after a predetermined period has elapsed for a condition where the temperature of said object is kept in a temperature range from a third predetermined temperature to a fourth predetermined temperature, said third predetermined temperature being higher than said first predetermined temperature and lower than said second predetermined temperature, said fourth predetermined temperature being higher than said second predetermined temperature.

3. The temperature control system according to claim 2, which further comprises a second disabling circuit for substantially disabling said central processing unit and control unit so as to stop heating of said object if the temperature of said object increases to said fourth predetermined temperature.

4. The temperature control system according to claim 3, wherein:
    said central processing unit and said control unit control a switching circuit, said switching circuit turning said heater on and off, said heater heating said object when it is turned on by said switching circuit; and said first disabling circuit and said second disabling circuit respectively control an interrupting circuit, said interrupting circuit interrupting a power supply to said heater.

5. The temperature control system according to claim 2, which further comprises a resetting circuit for resetting said first disabling circuit so as to enable said central processing unit and said control unit.

6. A temperature control system comprising:

a central processing unit processing information concerning a detection signal obtained from a temperature detection element and related to the temperature of an object so as to produce a control signal for controlling a switching circuit so as to make the temperature of said object substantially equal to a first predetermined temperature, said switching circuit turning a heater on and off, said heater heating said object when it is turned on by said switching circuit;

a control unit, which compares a detection voltage based on said detection signal with a predetermined reference voltage so as to produce a control signal for controlling said switching circuit independently of said central processing unit so as to make the temperature of said object substantially equal to a second predetermined temperature when said central processing unit is substantially disabled so that the temperature of said object increases, said second predetermined temperature being higher than said first predetermined temperature; and a first disabling circuit for interrupting a power supply to said heater after a predetermined period has elapsed for a condition where the temperature of said object is kept in a temperature range from a third predetermined temperature to a fourth predetermined temperature, said third predetermined temperature being higher than said first predetermined temperature and lower than said second predetermined temperature, said fourth predetermined temperature being higher than said second predetermined temperature.

7. A temperature control method comprising steps of:

(a) controlling a temperature of an object so as to make the temperature of said object substantially equal to a first predetermined temperature using a central processing unit for processing information concerning a detection signal obtained from a temperature detection element and related to the temperature of said object being controlled so as to produce a heater control signal for controlling operation of a heater used for heating said object; and (b) comparing a detection voltage based on said detection signal with a predetermined reference voltage so as to produce a heater control signal independently of said central processing unit and stopping heating of said object if the temperature of said object increases to a second predetermined temperature because said step (a) is substantially disabled, said second predetermined temperature being higher than said first predetermined temperature.

8. A temperature control method comprising steps of:

(a) controlling a temperature of an object so as to make the temperature of said object substantially equal to a first predetermined temperature using a central processing unit for processing information concerning a detection signal obtained from a temperature detection element and related to the temperature of said object being controlled so as to produce a heater control signal for controlling operation of a heater used for heating said object; and (b) comparing a detection voltage based on said detection signal with a predetermined reference voltage so as to produce a heater control signal independently of said central processing unit and controlling the temperature of said object so as to be substantially equal to a second predetermined temperature if the temperature of said object increases to said second predetermined temperature because said step (a) is substantially disabled; and (c) disabling said steps (a) and (b) substantially so as to stop heating of said object after a predetermined period has elapsed for a condition where the temperature of said object is kept in a temperature range from a third predetermined temperature to a fourth predetermined temperature, said third predetermined temperature being higher than said first predetermined temperature and lower than said second predetermined temperature, said fourth predetermined temperature being higher than said second predetermined temperature.

9. The temperature control method according to claim 8, which further comprises a step (d) disabling said steps (a) and (b) substantially so as to stop heating of said object if the temperature of said object increases to said fourth predetermined temperature.

* * * * *